Nov. 19, 1940.    J. A. BARRY    2,221,938
BOWLING BALL GRIP MEASURING DEVICE
Filed March 28, 1940    2 Sheets-Sheet 1

INVENTOR
Joseph A. Barry

Nov. 19, 1940.   J. A. BARRY   2,221,938
BOWLING BALL GRIP MEASURING DEVICE
Filed March 28, 1940   2 Sheets-Sheet 2

WITNESS:
Rob't R. Kitchel

INVENTOR
Joseph A. Barry
BY Russel, Harding
ATTORNEYS.

Patented Nov. 19, 1940

2,221,938

UNITED STATES PATENT OFFICE 2,221,938

BOWLING BALL GRIP MEASURING DEVICE

Joseph A. Barry, Philadelphia, Pa.

Application March 28, 1940, Serial No. 326,311

4 Claims. (Cl. 33—174)

This invention relates to a device for determining the proper location of the holes in a bowling ball for a particular purchaser.

Expert users of bowling balls generally desire to have the holes therein located so as to suit best their individual grips, and, for this purpose, there have been provided balls having numerous fixed combinations of holes therein so that a prospective purchaser of a ball may seek to find the most desirable combination of holes for his own use. In view of the fact that both the thumb and finger holes run through quite considerable ranges in steps of $\frac{1}{32}$ of an inch or, in some cases, of $\frac{1}{64}$ inch, and the spacing between the holes may also vary through a quite considerable range from 2¾ to 4 inches, it will be evident that even in the simple case of a ball having only two holes, the combinations possible are quite enormous in number. The balls provided for trial as above indicated generally have as a maximum about twelve combinations, falling far short of the total possibilities, and making it necessary for complete trial to have either a large number of different test balls or to permit merely some approximations to what is desired.

Another objection to such test balls is the fact that it is almost impossible to have a prospective customer make his trials in systematic fashion, with the result that much time is expended in trying to arrive at a satisfactory or approximately satisfactory combination.

It is the object of the present invention to provide a type of test ball capable of giving by adjustment all of the combinations of thumb and finger holes and spans in use. In accordance with the invention, one ball may be provided for giving the complete combinations for two holes and another for three holes covering substantially everything that is desired.

The above general object and more specific objects, particularly relating to details, will become apparent from the following description, read in conjunction with the accompanying drawings, in which:

Figure 4 is a developed view indicating for purposes of illustration the ranges of finger and thumb openings; and Figure 5 is a fragmentary development illustrating the application of the invention to an arrangement involving the use of a thumb hole and a pair of finger holes.

Figure 1:
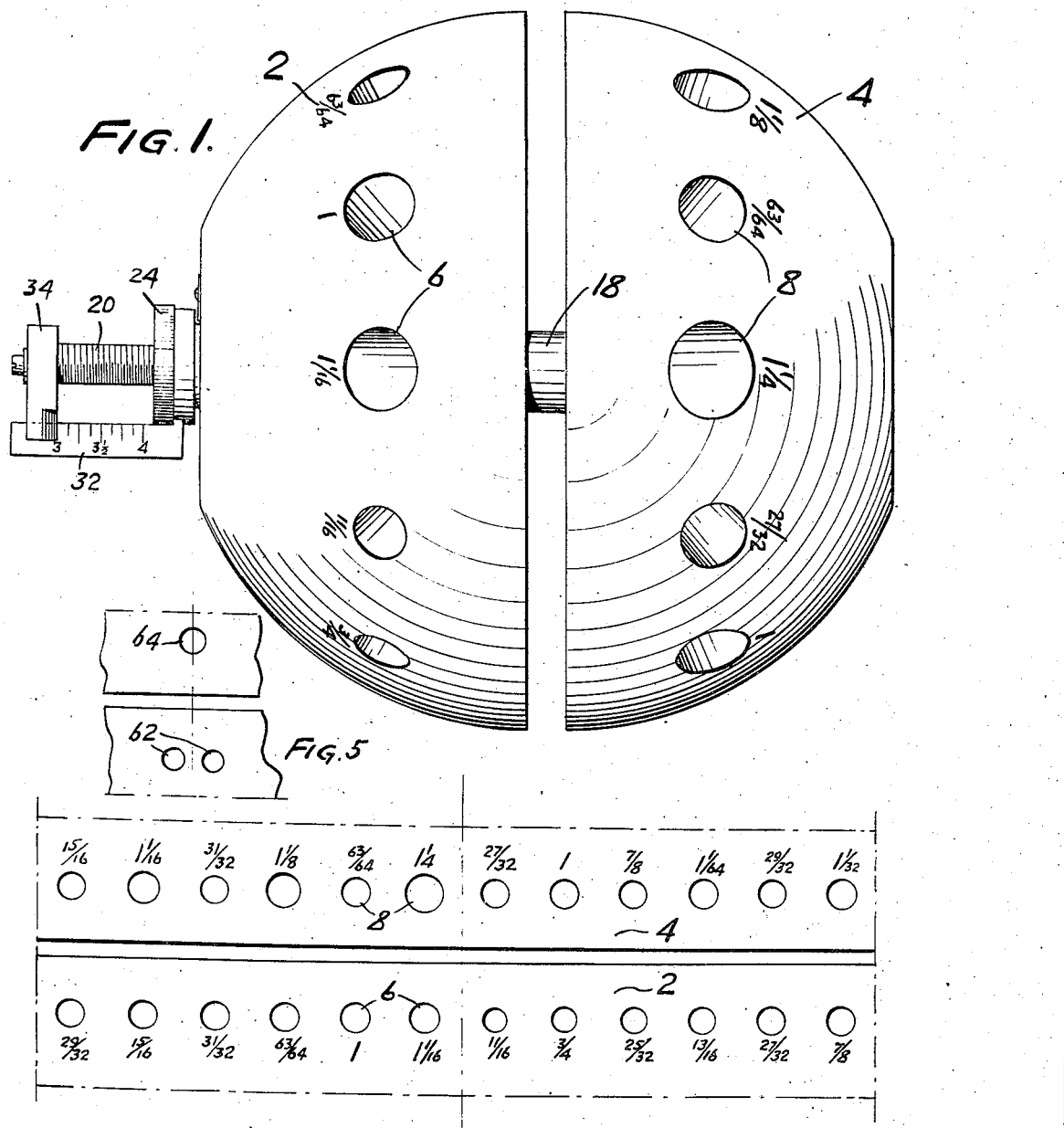
Figure 1 is a plan view of a test ball for a two hole arrangement embodying the features of the invention.
Figures 2, 3:
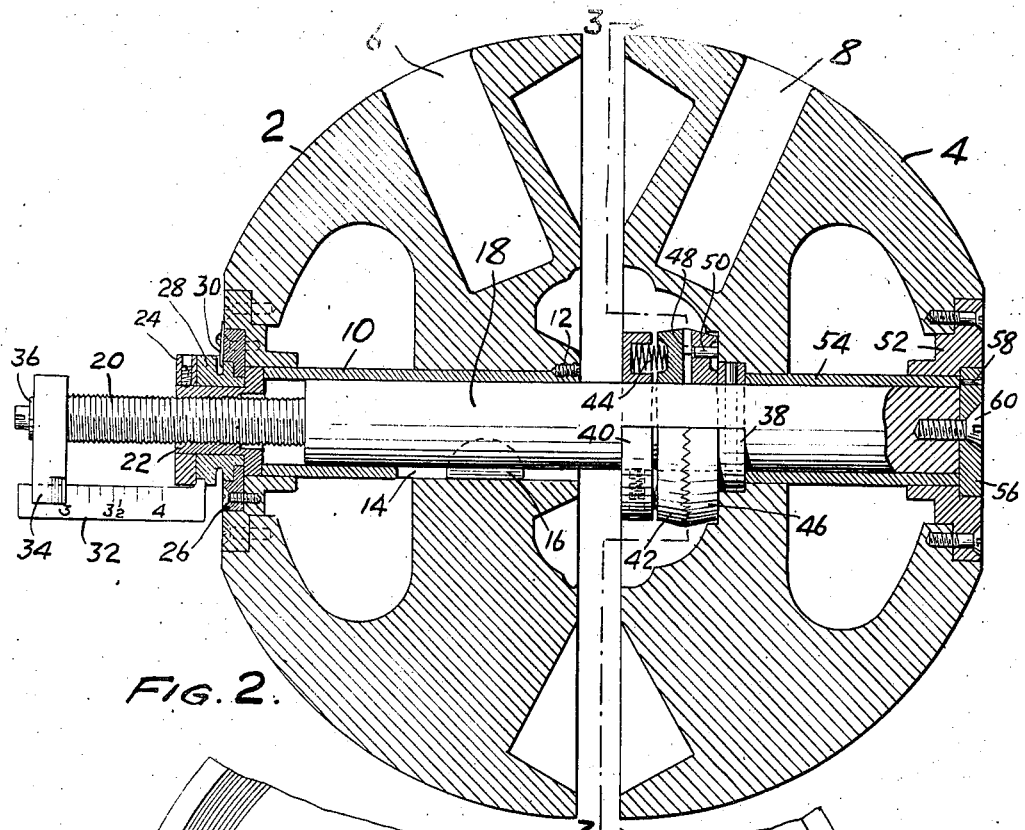
Figure 2 is a section through the same along the axis of adjustment.
Figure 3 is a fragmentary section taken on the broken surface the trace of which is indicated at 3—3 in Figure 2.

The improved device in accordance with the present invention comprises two substantial hemispheres 2 and 4 provided, respectively, with finger holes 6 and thumb holes 8. These two hemispheres and their associated parts involved in the adjustment are preferably made to have a total weight approximating that of a standard ball, while the radii of the hemispheres also approximate the radius of a standard ball. While, as will be evident hereafter, the shape departs slightly from that of a sphere in its various positions for adjustment, the departure is relatively slight, so that the test device has the feel of an actual ball, and may be handled and swung by a customer in making the tests, with the assurance that, when he finds a proper adjustment, the ball drilled in accordance therewith and delivered to him will be satisfactory.

Fixed in the hemisphere 2 is a sleeve 10, held against rotation by a screw 12 and provided with a slot 14 in which engages a key 16 carried in a seat in a shaft 18. Thus relative lengthwise movement is permitted between the hemisphere 2 and the shaft 18, while relative rotary movements are prevented. The shaft 18 has a threaded end 20 on which there is located a nut 22 provided with a knurled head 24 whereby it may be rotated. This nut is held in fixed axial position with respect to the hemisphere, but permitted to rotate therein by a flange arrangement indicated at 26, carried by the hemisphere. Surrounding the nut is a sleeve 28, rotation of which is restrained, to a moderate extent, by a friction spring 30. The sleeve 28 carries a scale 32, extending axially and adapted to be read against an index member 34, which is bifurcated to embrace it, and which is journalled on a cylindrical end portion 36 of the screw 20. The scale 32 is provided to indicate the spacing between the finger and thumb holes. The sleeve 28 is provided so that the scale may be rotated into a conventional position for reading and held in such position yieldably by the action of the friction imposed by the spring 30.

Fixed to the shaft 18 are collars 38 and 40 between which are located members 42 and 46 provided with interengaging angular teeth indicated at 48. Springs 44 urge the member 42 away from the collar 40 to cause its teeth to engage yieldably those of the member 46. The angles of the teeth are such that the imposition of relative rotary forces on the members 42 and 46 will cause the teeth to slide over each other and permit ready rotation, though the teeth will act as detents to prevent accidental displacement of the two hemispheres.

A pin 50 secured to the hemisphere 4 engages a hole in the member 46 to lock this member against rotation with respect to the hemisphere. The various elements 40, 42, 36 and 38 are received within an opening in the hemisphere 4, as shown.

The hemisphere 4 is journalled on a sleeve 54 surrounding the shaft 18, and lengthwise movement of the hemisphere 4 with respect to the shaft is prevented by engagement of its bore with the collars 38 and a sleeve portion 52 thereof with a cap member 56 secured to shaft 18 by screw 60 and provided with an opening engaging the pin 58 carried by the sleeve 54.

A desirable arrangement of the openings is illustrated in the developed view of Figure 4, in which it will be noted that a succession of order of sizes is afforded by jumping to alternate holes. The reason for this is because if the larger holes were located adjacent each other the peripheral spacing would have to be increased to prevent their intersecting where they converge adjacent the center of the ball. In the case of the smaller finger holes, however, a successive decrease in size is possible. The teeth 48 are preferably so arranged that some particular number of teeth, say, two or four, corresponds in angular spacing to the angular spacing of the holes. Thus, by the relative movement of the two hemispheres, different pairs of holes may be brought into alignment.

An advantageous arrangement of holes involves having in one-half a ball holes which may be used alternatively as the finger holes of large hands and as the thumb holes of small hands. Such holes will overlap in size. On the other half of the ball there may then be provided large thumb holes and small finger holes. If these are alternated as indicated herein, no difficulties are involved in drilling without interference of the holes.

The use of the device is quite simple. The prospective customer may, for example, first seek a thumb hole which meets his requirements. Then, with his thumb in such hole, he may relatively rotate the two hemispheres to secure in alignment with that thumb hole a finger hole which also seems most desirable. By rotation of the nut 22, the spacing between the holes may be varied until this also seems most desirable. When this condition is reached, the two hemispheres may be again rotated to determine whether larger and smaller holes may not be more satisfactory, and slight adjustments of the spacing may also be made for the same purpose. Thus it is possible in quite systematic fashion, to arrive very readily at the proper hole sizes and spacings for that customer. These are then noted and the ball drilled properly in accord therewith.

Figure 5 illustrates merely a single setting showing how in a similar ball the finger holes 62 may be arranged in pairs with the usual conventional spacing and, like the single finger holes of the first modification, lined up with various thumb holes 64. Alternatively, the conventional offset arrangement may be provided. This may be effected, however, merely by having detents so located that the positions of holes 62 with respect to holes 64 may be either according to conventional or offset drilling.

To take into account variations in pitch, separate balls may be provided having holes of different pitches. In general however, the usual ball having a ⅜ inch pitch will suffice to give a very clear idea of the fashion in which drilling should be accomplished.

What I claim and desire to protect by Letters Patent is:

1. A device of the type described comprising a pair of hemispherical members and means mounting said members for radial adjustment toward and from each other and for holding said members in adjusted position against radial movements in either direction relative to each other, said members having series of thumb and finger holes, respectively, therein.

2. A device of the type described comprising a pair of hemispherical members, means providing an axis fixed relative to and joining said members and about which said members are coaxially rotatable, and means for adjustably fixing said members in various radial positions along said common axis, said members having series of thumb and finger holes, respectively, therein.

3. A device of the type described comprising a pair of hemispherical members, means joining said hemispherical members adjustable to vary their spacing from each other while such hemispherical members are fixed angularly relative to each other, and means providing for relative rotation of said hemispherical members about said joining means without varying their spacing, said members having series of thumb and finger holes, respectively, therein.

4. A device of the type described comprising a pair of hemispherical members, means mounting said members for radial adjustment toward and from each other for holding said members in adjusted position against radial movements relative to each other, and means for indicating the position of such adjustment, said members having series of thumb and finger holes, respectively, therein.

JOSEPH A. BARRY.